United States Patent
Wiley et al.

(10) Patent No.: US 7,712,981 B2
(45) Date of Patent: May 11, 2010

(54) COMPACT, ACTIVE ALIGNMENT FUSION SPLICER WITH AUTOMATIC VIEW-ANGLE COMPENSATION

(75) Inventors: Robert G. Wiley, Frankfurt, KY (US); Brett G. Clark, Whites Creek, TN (US); Jared Meitzler, Spring Hill, TN (US)

(73) Assignee: 3SAE Technologies, Inc., Franklin, TN (US)

( * ) Notice: Subject to any disclaimer, the term of this patent is extended or adjusted under 35 U.S.C. 154(b) by 0 days.

(21) Appl. No.: 12/102,576

(22) Filed: Apr. 14, 2008

(65) Prior Publication Data

US 2009/0046982 A1    Feb. 19, 2009

Related U.S. Application Data

(60) Provisional application No. 60/911,523, filed on Apr. 13, 2007.

(51) Int. Cl.
*G02B 6/255* (2006.01)
*G02B 6/00* (2006.01)

(52) U.S. Cl. ............... 385/97; 385/95; 385/96; 385/98; 385/134; 385/136; 385/137

(58) Field of Classification Search ............. 385/95–99, 385/136–137
See application file for complete search history.

(56) References Cited

U.S. PATENT DOCUMENTS

| | | | |
|---|---|---|---|
| 4,220,394 A * | 9/1980 | Tardy | ............... 385/64 |
| 7,077,579 B2 | 7/2006 | Bush et al. | |
| 7,447,415 B2 * | 11/2008 | Melville et al. | ............. 385/137 |
| 2007/0183464 A1 * | 8/2007 | Poulsen et al. | ................. 372/6 |

* cited by examiner

*Primary Examiner*—Ryan Lepisto
(74) *Attorney, Agent, or Firm*—Mills & Onello, LLP; David M. Mello

(57) ABSTRACT

In accordance with various aspects of the present invention, provided is an extremely compact, simple, and cost-effective approach for aligning optical fibers in an optical fiber fusion splicer. The basis of this alignment method is an "S"-Curve Piezo Bending Actuator. The device comprises a thin strip of elastically flexible material (such as spring steel, beryllium copper, or fiber reinforced polymer) that is coated in four areas with a piezoelectric material (such as barium titanate or other known compounds).

15 Claims, 4 Drawing Sheets

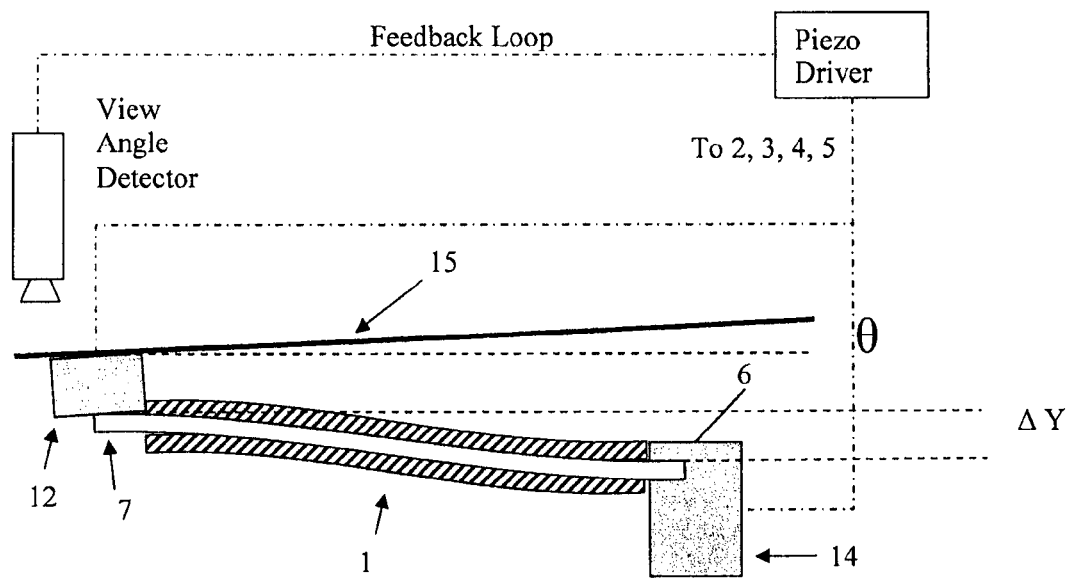
FIG. 6
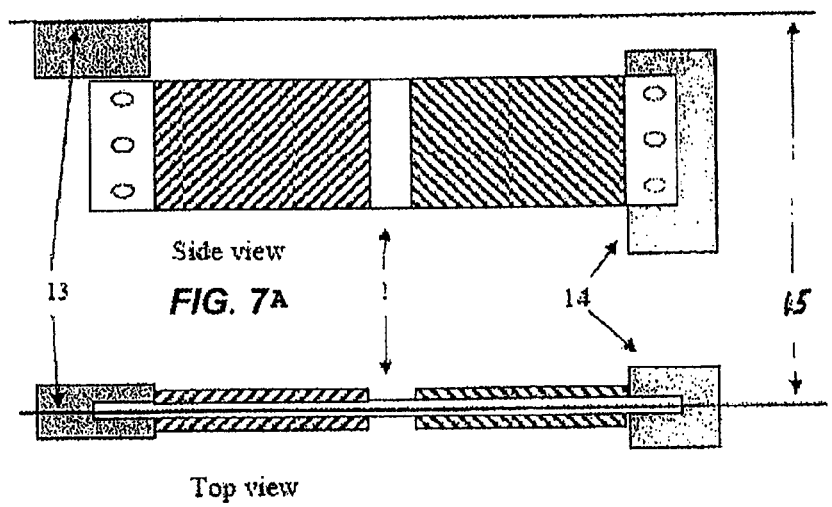
FIG. 7A
FIG. 7B

COMPACT, ACTIVE ALIGNMENT FUSION SPLICER WITH AUTOMATIC VIEW-ANGLE COMPENSATION

CROSS REFERENCES TO RELATED APPLICATIONS

This application claims the benefit of priority under 35 U.S.C. §119(e) from co-pending, commonly owned U.S. provisional patent application Ser. No. 60/911,523, entitled COMPACT, ACTIVE ALIGNMENT FUSION SPLICER WITH AUTOMATIC VIEW-ANGLE COMPENSATION, filed Apr. 13, 2007.

FIELD OF INTEREST

The present inventive concepts relate to the field fiber optics, and more particularly optical fiber splicers.

BACKGROUND

Transmission of data via optical fibers, serving as optical fiber waveguides, is widespread in many applications and industries, such as the telecommunications and computer industries. In many applications, electrical signals are converted into light pulses and propagated through optical fiber. The lights pulses leaving the optical fiber can then be converted back into electrical signals and processed.

Fiber optics has many advantages in many industries. For example, the use of optical fibers can result in significant improvements in bandwidth over more traditional means of communications. Another benefit is that optical fiber connections are far less vulnerable to electromagnetic disruptions and nuclear radiation, than other transmission mediums. In fact, fiber optics are now widely used in aerospace and shipboard applications for many of these reasons.

In many situations repair of optical fibers is required in the field. Such repair typically requires splicing fibers together using a splicer. Splicing operations in the field can be hampered by the environment and limited length of slack in the fiber that may be accessible for the technician to manipulate into a splicing device. Accordingly, there is a need for reliable portable fiber splicers that can be used in the filed, so are not overly large or cumbersome.

Optical fiber waveguides in common use share a number of structural features. The waveguide almost invariably comprises a thin, elongated fiber core responsible for conducting the light and at least one additional layer. Most often the fiber core is highly pure glass surrounded by a first and intimately bonded layer termed a cladding and an outer layer called a buffer. The cladding, usually also glass, has an index of refraction lower than that of the core to insure that light is constrained for transmission within the core by total internal reflection. Typically, the buffer is composed of plastic or polymer and serves to protect the inner layers mechanically and to prevent attack by moisture or other substances present in the fiber's environment. Commonly a plurality of individual fibers (in some cases as many as a thousand) are bundled together and enclosed in a protective jacket to form a cable.

Commonly used fibers may further be classified as multimode or single mode. Multimode fibers typically comprise cores having diameters of 50-62.5 µm but in some cases up to 100 µm. Single mode fibers generally have a much smaller core that may be 9 µm or less in diameter. The glass cladding diameter is most commonly 125 µm but sometimes is 140 µm (with a 100 µm core). The exterior diameter is largely a function of the buffer coating, with 250 µm most common, although some fiber coatings may be as much as 900 µm in diameter. Alignment of fibers is a crucial part of the preparation for any splicing operation, but is especially challenging for single mode fibers that have small core diameter. In order to produce a high quality, low-loss splice, the two opposing ends to be joined must be aligned laterally to within a small fraction of the core diameter. Of course, the smaller the fiber diameter, the smaller the allowed deviation from perfect abutting alignment that may be tolerated.

Most fiber optic data transmission systems transmit information using electromagnetic radiation in the infrared band, including wavelengths such as 850 nm for multimode fibers and 1310 and 1550 nm for single mode fibers. The nomenclature "light" is invariably employed for this radiation, even though the cited wavelengths fall outside the range visible to humans.

Mechanical and fusion splicing are the two typical approaches for splicing optical fibers. Mechanical splicing is accomplished by securing the ends of two fibers in intimate proximity with an aligning and holding structure. Often the fibers are inserted into the opposing ends of a precision ferrule, capillary tube, or comparable alignment structure. The fibers are then secured mechanically by crimping, clamping, or similar fastening. Mechanical splicing is conceptually simple, and minimal apparatus is required to effect splicing, but a mechanical splice tends to have relatively high and undesirable insertion loss, typically 0.20 dB. In addition, mechanical splices are generally weaker than the underlying fiber and are vulnerable to degradation of the optical quality of the splice over time, especially under adverse environmental conditions such as varying temperatures and high humidity. Mechanical splices are generally regarded as being temporary expedients at best and are not useful for high bandwidth systems or permanent joints.

Fusion splicing entails the welding of the two fibers, by softening and joining the ends of the fibers to each other. Heat is typically used to induce softening using a small electric arc struck between miniature pointed electrodes mounted in opposition and substantially perpendicular to the common axis of the fibers. Upon cooling, a strong, low-loss joint is formed. Fusion splices exhibit very low losses along with high stability and durability. A heat-shrinkable tube is typically applied over the completed joint for protection, which replaces a buffer coating removed prior to splicing.

For a low insertion loss splice the axes of the fibers must be collinear, within about 0.1 degree, and aligned laterally within a small fraction of the core diameter to achieve the desired loss of less than about 0.03 dB. This required precision of alignment presents a substantial technical challenge, especially with single-mode fibers having cores approximately 9 µm diameter. Three general approaches have been used. Mechanical fixturing can be used, such as the alignment ferrules and other forms of pre-aligned V-grooves and the like. These purely mechanical approaches do not reliably produce splices that maintain less than 0.10 dB loss.

More sophisticated approaches employ some form of optically assisted fiber positioning. For example, profile alignment system (PAS) is an approach where the splicing apparatus incorporates an optical system that acquires images of the two fibers taken in two lateral directions, allowing the fibers to be positioned in two directions orthogonal to the mutual fiber axes. PAS systems can incorporate either manual positioning or computerized image processing to optimize fiber alignment. However, the diffraction limit and the resolution of available electro-optic cameras restrict the precision achievable with PAS, even in systems based on visible light with wavelengths of about 400-700 nm. The effectiveness of PAS in aligning small diameter, e.g., single mode fibers, is limited.

Still more advanced positioning methods employ measurement of actual light transmission between the fibers being joined, where the positioning of the fibers is adaptively adjusted to maximize light transmission prior to the fusion operation. This approach can permit alignment better than that achievable with PAS systems, but requires carefully controlled laboratory conditions.

U.S. Pat. No. 7,077,579 to Bush, et al. described the use of piezoelectric bimorphs in fusion splicers as a means for aligning fibers to be spliced, as shown in FIG. 1 herein. Each side is coated with a single connected area, providing a continuous curve along the length of the substrate, as shown in FIG. 2. If one end is rigidly mounted, and voltages are applied to create a linear displacement of the distal end, a corresponding angular displacement I produced. If this angular displacement were conveyed to the optical fiber to be aligned, the angular displacement would produce unacceptable results. Therefore, prior art systems employ bimorph benders in pairs, connecting rigid blocks in a parallelogram arrangement as shown in FIG. 1. Blocks 8 and 9 are connected by a pair of piezo bimorphs. Flexible mounting arrangements (10a, 10b, 11a, 11b) are provided, to accommodate the continuously curved nature of the simple bimorphs. However, the need for connecting blocks, flexible mountings, and paired bimorphs adds to the cost, complexity, and difficulty of alignment using such prior art devices.

To date, the methods and apparatus for carrying out splicing aided either by the PAS, transmission-based alignment, and piezoelectric bimorphs techniques have not been well suited for use outside the laboratory or other similar workplaces. The required equipment lacks the flexibility, versatility, and ruggedness needed for field use. Moreover, present equipment is cumbersome and often not operable in the confined spaces frequently encountered during field service.

SUMMARY OF DISCLOSURE

In accordance with aspects of the present disclosure, provided is an apparatus and a method that enable extremely compact, simple, and cost-effective alignment of optical fibers in an optical fiber fusion splicer. The basis of this alignment method is an "S"-Curve Piezo Bending Actuator. The apparatus comprises a thin strip of elastically flexible material (such as spring steel, beryllium copper, or fiber reinforced polymer) that is coated in four areas with a piezoelectric material (such as barium titanate or other known compounds).

In accordance with one aspect of the present invention, provided is a fiber aligner comprising: a thin strip of elastically flexible material; and a plurality of piezoelectric-material-coated areas formed on the thin strip.

The thin strip can include a first side and a second side, and at least one of the plurality of piezoelectric-material-coated areas can be formed on the first side and another of the plurality of piezoelectric-material-coated areas can be formed on the second side.

The thin strip can include a first side and a second side, and the plurality of piezoelectric-material-coated areas can include first and second piezoelectric-material-coated areas formed on the first side and third and fourth piezoelectric-material-coated areas formed on the second side.

The first piezoelectric-material-coated area can be opposite the third piezoelectric-material-coated area and the second piezoelectric-material-coated area can be opposite the fourth piezoelectric-material-coated area.

The thin strip of elastically flexible material can be formed of a material from a group consisting of spring steel, beryllium copper, and fiber reinforced polymer.

The piezoelectric-material-coated areas can be coated with a piezoelectric material taken from a group consisting of barium and titanate.

The thin strip can include a first end configured to attach to a fiber support and a second end configured to attach to a mounting block.

The thin strip of elastically flexible material and the plurality of piezoelectric-material-coated areas formed on the thin strip can be configured to move a fiber loaded in the fiber support in a first direction.

The thin strip of elastically flexible material and the plurality of piezoelectric-material-coated areas formed on the thin strip can also be configured to move the fiber loaded in the fiber support in a second direction, which is substantially orthogonal to the first direction.

The thin strip of elastically flexible material and the plurality of piezoelectric-material-coated areas formed on the thin strip can be configured to move a fiber loaded in the fiber support in a rotational direction.

The fiber aligner can further comprise a view angle detector configured to detect an angular misalignment of two optical fibers.

The fiber aligner can further comprise a feedback loop configured to selectively deliver voltages to the a plurality of piezoelectric-material-coated areas formed on the thin strip to cause a deflection in the thin strip that substantially aligns the two optical fibers.

In accordance with another aspect of the invention, provided is a fiber splicing system comprising: a fiber support configured to hold at least one fiber; a fiber aligner coupled to the fiber support; and a splicer configured to splice the at least one optical fiber with another optical fiber. The fiber aligner comprises a thin strip of elastically flexible material; and a plurality of piezoelectric-material-coated areas formed on the thin strip.

The thin strip can include a first side and a second side, and at least one of the plurality of piezoelectric-material-coated areas can be formed on the first side and another of the plurality of piezoelectric-material-coated areas can be formed on the second side.

The thin strip can include a first side and a second side, and the plurality of piezoelectric-material-coated areas can include first and second piezoelectric-material-coated areas formed on the first side and third and fourth piezoelectric-material-coated areas formed on the second side.

The first piezoelectric-material-coated area can be opposite the third piezoelectric-material-coated area and the second piezoelectric-material-coated area can be opposite the fourth piezoelectric-material-coated area.

The system can further comprise a view angle detector configured to detect an angular misalignment of the at least one optical fiber with the other optical fiber.

BRIEF DESCRIPTION OF THE DRAWINGS

The drawing figures depict preferred embodiments by way of example, not by way of limitation. In the figures, like reference numerals refer to the same or similar elements.

FIG. 6 shows a view of linear and axial displacement with angular offset, in accordance with aspects of the present invention.

FIGS. 7A and 7B show an arrangement that provides motion in the X direction—using two views, in accordance with aspects of the present invention.

DETAILED DESCRIPTION OF PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 1:
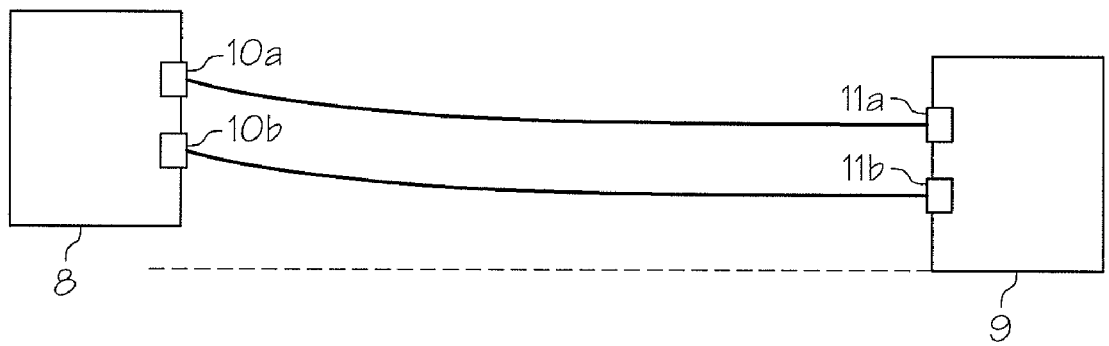
FIG. 1 is a diagram showing how paired bimorphs with flexible mountings are used in the prior art to provide X displacement without angle.
Figure 2:
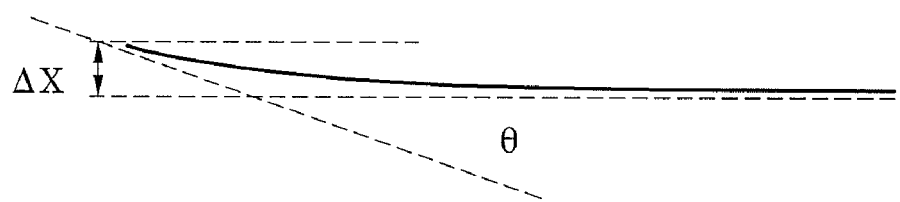
FIG. 2 show a view of a prior art single bimorph, wherein X direction displacement causes an angular displacement.
Figure 3A:
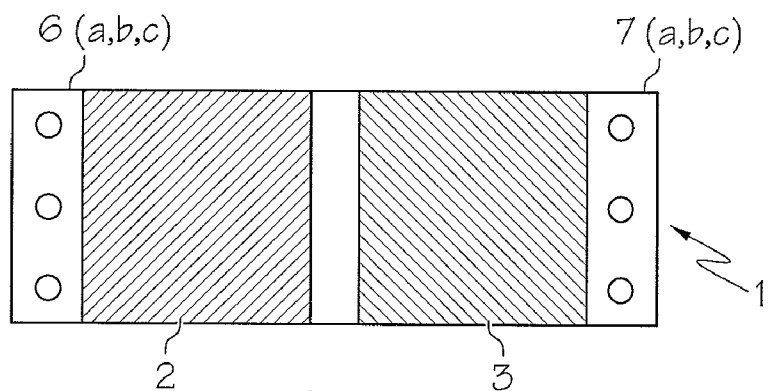
FIGS. 3A and 3B are embodiments of an "S" Curve Piezao bender, in accordance with the present disclosure.
Figure 3B:
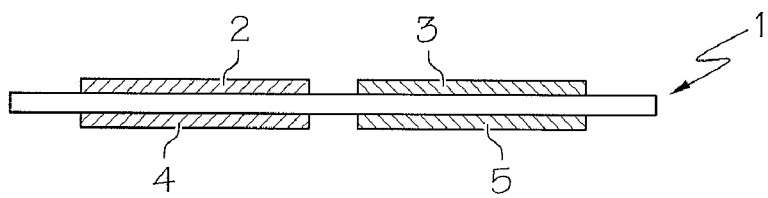
Figure 4:
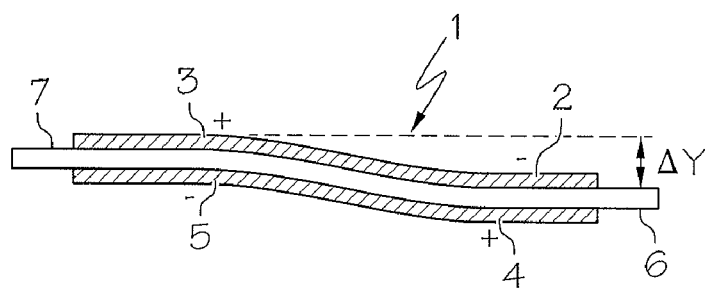
FIG. 4 is an embodiment of an "S" Curve action producing Y-axis displacement with mountings parallel, in accordance with the present disclosure.

In accordance with the present invention, provided is an extremely compact, simple, and cost-effective approach for aligning optical fibers in an optical fiber fusion splicer. The basis of this alignment method is an "S"-Curve Piezo Bending Actuator, as shown in FIGS. 3A and 3B. The device includes a thin strip of elastically flexible material 1 (such as spring steel, beryllium copper, or fiber reinforced polymer) that is coated in four areas (2, 3, 4, 5) with a piezoelectric material (such as barium titanate or other known compounds). Piezoelectric materials expand or contract as electrical potentials are applied to their surfaces. If, therefore, opposite electric potentials are applied to areas 2 and 4, the portion of 1 between areas 2 and 4 will be bent into a curve ("bimorph action"). If the potential directions are reversed for areas 3 and 5, the overall shape of the substrate 1 will assume an "S" shape, as shown in FIG. 4. The "S" actuator is provided with uncoated mounting areas 6 and 7, each provided with mounting holes (6a, 6b, 6c, 7a, 7b, 7c). Wires or other conductors, not shown, are arranged to convey the voltages to the surfaces of the coated areas.

Referring back to FIGS. 3A and 3B, the present invention has no need of paired actuators, parallelogram blocks, or flexible mountings. Angular displacements of the two halves of the actuator substantially cancel each other out. Therefore, one end may be held rigidly fixed and the other end may be mounted rigidly to the support for the fiber. The two mounting areas will remain parallel through the useful range of motion.

FIG. 4 shows how the present invention may be used to move the fiber to provide alignment. By operating the actuator as described above (in conjunction with FIGS. 3A and 3B), a displacement in an upward (Y+) direction will occur. Reversing the polarity will produce a Y− displacement. Adjusting the voltages applied can produce very fine adjustments of the displacement (to <0.1 um resolution).

Figure 5:
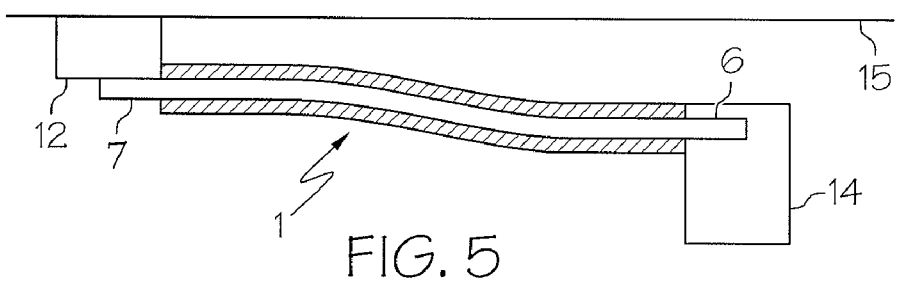
FIG. 5 is a side view depicting how the present invention provides very compact, simple arrangement.

As shown in FIG. 5, the illustrative embodiment allows for a very simple and compact approach for providing motion to align an optical fiber. A stationary rigid mounting block 14 is affixed to the mounting area 6 at one end of the "S" actuator 1. The distal mounting area 7 is rigidly affixed to a fiber support 12, which is provided with a precision groove 13 to receive the fiber 15 on its upper surface. Various known holding, supporting and clamping devices can be used to restrain the fiber so that it properly enters the groove 13. The fiber support/groove (12, 13) is preferably made from a material such as zirconia ceramic, which can be ground to very high precision to provide an accurate groove to match the shape of the fiber. The characteristics of these materials and grooved surfaces are well known in the art, so not disclosed in detail herein.

Figure 8:
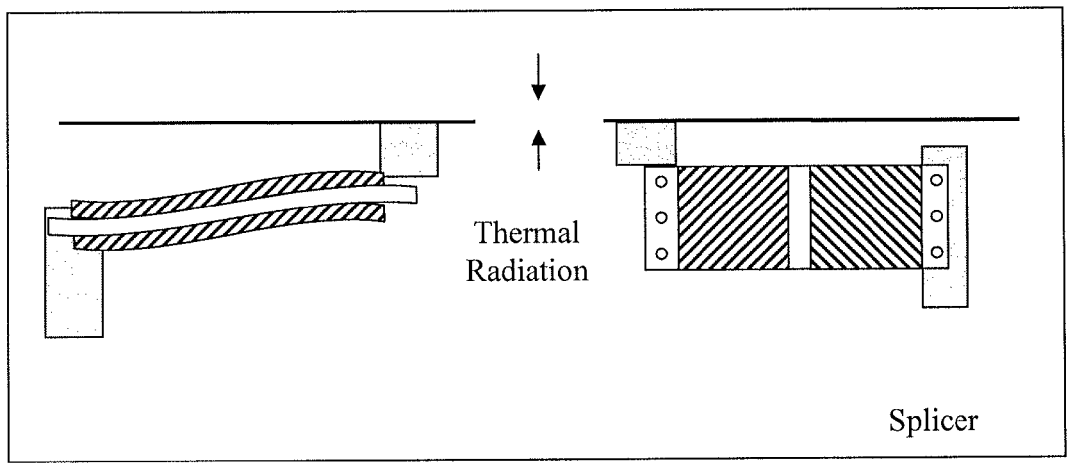
FIG. 8 shows a splicer using the devices and arrangements of FIGS. 6 and 7, in accordance with aspects of the present invention.

As shown in FIG. 6, the present invention provides a view of linear and axial displacement with angular offset, in accordance with aspects of the present invention. An additional degree of freedom of motion is provided by the illustrative method of unbalancing the curvature applied to the halves of the "S" bender. This can be accomplished by individually varying the voltages applied to the opposing piezoelectric pairs. If, for example, areas 2, 3, 4, and 5 were supplied with −40V, +35V, +40V and −35V, respectively, the length of the substrate 1 bounded by areas 2 and 4 would be more curved than the length bounded by 3 and 5. An angular displacement of the distal end would result—mounting areas 6 and 7 would no longer be parallel. This would be undesirable if all other alignments were perfect. However, it is common for mechanical misalignments to occur elsewhere, particularly at the interface of the fiber 15 and the groove 13. These misalignments can be caused by irregularities in the fiber surface, or by the presence of dirt particles. These misalignments produce an angular misalignment of the two fibers to be spliced, referred to as a "view angle". With the present invention, the splicer's computer system can optically detect the view angle and then correct it by the appropriate inputs to the "S" actuator (such as the splicer shown in FIG. 8). Most modern splicers are already capable of detecting the angular misalignment before splicing, but they do not have any capability of correcting at, as prior art actuators provide linear motion only. This approach for providing angular displacement can also be used in conjunction with the splicer's optics to provide closed-loop control of angular position, to zero-out any angular bias in the actuator caused by manufacturing tolerances of the piezo parts.

FIGS. 7A and B shows an arrangement that provides motion in the X direction—using two views, in accordance with aspects of the present invention. It is, of course, necessary to provide alignment in at least X (horizontal), Y (vertical), and Z (axial) directions between the two fibers to be spliced. FIG. 7 illustrates how the present invention is easily adapted to the orthogonal lateral (X) direction. The motion in Z direction can be provided by other devices known in the art (stepper motors, for example). This is appropriate, as the Z axis requires relatively more motion (e.g., 1 mm or more) with less resolution (e.g., 1 um typical).

It should be recognized that the illustrative embodiment displaces the fiber support platforms in the Z axis as a side effect of its action to align the X and/or Y axes. If known arrangements of the Z axis alignment are used, wherein the fiber support platforms allow the fiber to translate freely in the Z axis, this will produce no undesirable result for the alignment. In these systems, Z-axis motion is performed by moving the fiber axially from a point distal to the fiber support platforms, such as a detachable fiber holder receptacle coupled to an actuator.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein.

What is claimed is:

1. A fiber aligner comprising:
    a thin strip of elastically flexible material; and
    a plurality of piezoelectric-material-coated areas formed on the thin strip,
wherein the thin strip includes a first side and a second side, and the plurality of piezoelectric-material-coated areas includes first and second piezoelectric-material-coated areas formed on the first side and third and fourth piezoelectric-material-coated areas formed on the second side.

2. The fiber aligner of claim 1, wherein the first piezoelectric-material-coated area is opposite the third piezoelectric-material-coated area and the second piezoelectric-material-coated area is opposite the fourth piezoelectric-material-coated area.

3. The fiber aligner of claim 1, wherein the thin strip of elastically flexible material is formed of a material from a group consisting of spring steel, beryllium copper, and fiber reinforced polymer.

4. The fiber aligner of claim 1, wherein the piezoelectric-material-coated areas are coated with a piezoelectric material taken from a group consisting of barium and titanate.

5. The fiber aligner of claim 1, wherein the thin strip includes a first end configured to attach to a fiber support and a second end configured to attach to a mounting block.

6. The fiber aligner of claim 5, wherein the thin strip of elastically flexible material and the plurality of piezoelectric-material-coated areas formed on the thin strip are configured to move a fiber loaded in the fiber support in a first direction.

7. The fiber aligner of claim 6, wherein the thin strip of elastically flexible material and the plurality of piezoelectric-material-coated areas formed on the thin strip are also configured to move the fiber loaded in the fiber support in a second direction, which is substantially orthogonal to the first direction.

8. The fiber aligner of claim 5, wherein the thin strip of elastically flexible material and the plurality of piezoelectric-material-coated areas formed on the thin strip are configured to move a fiber loaded in the fiber support in a rotational direction.

9. The fiber aligner of claim 1, further comprising:
    a view angle detector configured to detect an angular misalignment of two optical fibers.

10. The fiber aligner of claim 9, further comprising:
    a feedback loop configured to selectively deliver voltages to the a plurality of piezoelectric-material-coated areas formed on the thin strip to cause a deflection in the thin strip that substantially aligns the two optical fibers.

11. A fiber splicing system comprising:
    a fiber support configured to hold at least one fiber;
    a fiber aligner coupled to the fiber support, the fiber aligner comprising:
        a thin strip of elastically flexible material; and
        a plurality of piezoelectric-material-coated areas formed on the thin strip; and
    a splicer configured to splice the at least one optical fiber with another optical fiber.

12. The system of claim 11, wherein the thin strip includes a first side and a second side, and at least one of the plurality of piezoelectric-material-coated areas is formed on the first side and another of the plurality of piezoelectric-material-coated areas is formed on the second side.

13. The system of claim 11, wherein the thin strip includes a first side and a second side, and the plurality of piezoelectric-material-coated areas includes first and second piezoelectric-material-coated areas formed on the first side and third and fourth piezoelectric-material-coated areas formed on the second side.

14. The system of claim 13, wherein the first piezoelectric-material-coated area is opposite the third piezoelectric-material-coated area and the second piezoelectric-material-coated area is opposite the fourth piezoelectric-material-coated area.

15. The system of claim 11, further comprising:
    a view angle detector configured to detect an angular misalignment of the at least one optical fiber with the other optical fiber.

* * * * *

UNITED STATES PATENT AND TRADEMARK OFFICE
CERTIFICATE OF CORRECTION

| | | |
|---|---|---|
| PATENT NO. | : 7,712,981 B2 | Page 1 of 1 |
| APPLICATION NO. | : 12/102576 | |
| DATED | : May 11, 2010 | |
| INVENTOR(S) | : Robert G. Wiley et al. | |

It is certified that error appears in the above-identified patent and that said Letters Patent is hereby corrected as shown below:

Column 8, line 21 delete "the a" and insert --the--

Signed and Sealed this

Twenty-first Day of December, 2010

David J. Kappos
*Director of the United States Patent and Trademark Office*